United States Patent [19]

Webb et al.

[11] 4,268,429

[45] May 19, 1981

[54] NOVEL FLAME RETARDANT POLYCARBONATE COMPOSITIONS

[75] Inventors: Jimmy L. Webb, Ballston Lake, N.Y.; Joseph B. Williams, Mt. Vernon, Ind.

[73] Assignee: General Electric Company, Schenectady, N.Y.

[21] Appl. No.: 597,005

[22] Filed: Jul. 18, 1975

[51] Int. Cl.³ .......................... C08K 3/30; C08K 5/02; C08K 5/06

[52] U.S. Cl. ........................... 260/37 PC; 260/45.7 R; 260/45.7 ST; 260/45.95 G

[58] Field of Search ..................... 260/45.7 R, 45.7 S, 260/37 PC, DIG. 24, 45.7 ST

[56] References Cited

U.S. PATENT DOCUMENTS

| | | | |
|---|---|---|---|
| 3,418,263 | 12/1968 | Hindersinn et al. | 260/45.7 RL |
| 3,535,300 | 10/1970 | Gable | 260/45.7 RL |
| 3,582,510 | 6/1971 | Cannelongo | 260/45.7 P |
| 3,624,024 | 11/1971 | Caldwell et al. | 260/40 R |
| 3,739,060 | 6/1973 | Tomiyama et al. | 423/512 |
| 3,751,396 | 8/1973 | Gall | 260/45.95 G |
| 3,773,715 | 11/1973 | Largman et al. | 260/45.7 P |
| 3,817,907 | 6/1974 | Muller et al. | 260/37 |
| 3,847,864 | 11/1974 | Chase et al. | 260/45.95 G |
| 3,852,238 | 12/1974 | Luce | 260/45.95 G |
| 3,855,277 | 12/1974 | Fox | 260/45.7 |
| 3,875,107 | 4/1975 | Nouvertne et al. | 260/37 |
| 4,028,297 | 6/1977 | Webb | 260/45.7 S |

*Primary Examiner*—Maurice J. Welsh
*Assistant Examiner*—R. A. White
*Attorney, Agent, or Firm*—F. Wesley Turner; James C. Davis, Jr.; Joseph T. Cohen

[57] ABSTRACT

This invention is concerned with a new class of flame retardant polycarbonate compositions. More particularly, the invention is concerned with admixtures of an aromatic polycarbonate and a flame retardant additive combination consisting of a halogenated organic compound and an alkali or alkaline earth metal salt of an inorganic sulfur compound. The flame retardant polycarbonates can be molded or formed into flame retardant articles such as films, sheets, fibers, laminates or reinforced plastics by conventional techniques.

10 Claims, No Drawings

NOVEL FLAME RETARDANT POLYCARBONATE COMPOSITIONS

This invention is concerned with a new class of polycarbonate compositions made flame retardant by the addition of a halogenated organic compound and certain alkali or alkaline earth metal salts of inorganic sulfur compounds.

Various observations have been made by the prior art regarding flame retardant additives for polycarbonate compositions including J. L. Webb's copending disclosure, i.e. U.S. Ser. No. 597,006, filed July 18, 1975 (assigned to the assignee of this invention) which describes flame retardant polycarbonate compositions which contain flame retardant additives selected from alkali and alkaline earth metal salts of inorganic sulfur compounds. Additional observations regarding flame retardant additives for polycarbonate compositions are set out in U.S. Ser. Nos. 429,120, now U.S. Pat. No. 3,940,366; 429,121, now U.S. Pat. No. 3,948,851; 429,125 still pending, filed Dec. 28, 1973; 429,126, now U.S. Pat. No. 3,978,024; 429,127, now U.S. Pat. No. 3,953,399; 429,128, now U.S. Pat. No. 3,953,396; 429,163, now U.S. Pat. No. 3,909,490; 429,164 still pending, filed Dec. 28, 1973; 429,165, now U.S. Pat. No. 3,917,559; 429,166, now U.S. Pat. No. 3,919,167; 429,642, now U.S. Pat. No. 3,926,908; 429,644 still pending, filed Dec. 28, 1973; 429,645, now U.S. Pat. No. 3,931,100; and 429,646, now U.S. Pat. No. 3,951,910 (all assigned to the assignee of this invention) which describe the use of certain organic salts—either alone or as mixtures thereof, or in combination with other materials—to impart fire-resistance to polycarbonate compositions.

Unexpectedly, we have found that combinations of an alkali or alkaline earth metal inorganic sulfur compound and a halogenated organic compound in admixture with an aromatic polycarbonate provides a flame retardant polycarbonate composition which meets the V-O test for flammability of plastic materials described by Underwriters' Laboratories Bulletin No. 94 without deleteriously affecting the physical properties commonly associated with flame retardant aromatic polycarbonate compositions.

In essence, out invention comprises a novel flame retardant polycarbonate composition containing an aromatic polycarbonate and a flame retardant additive combination consisting of a halogenated organic compound and an alkali or alkaline earth metal salt of an inorganic sulfite, thiosulfate, dithionite or a pyrosulfite and mixtures thereof. Another embodiment comprises an admixture an aromatic polycarbonate, the aforesaid flame retardant additive combination and a glass fiber.

In general, any aromatic polycarbonate can be employed in our invention, including those derived from aromatic bis-hydroxy compounds, and in particular, e.g., those manufactured from dihydric phenols, such as resorcinol, hydroquinone or dihydroxydiphenyl, from bis(hydroxyphenyl)-alkanes, such as, e.g., bis(4-hydroxyphenyl)propane-2,2 from trinuclear bisphenols, such as, e.g. α,α'-bis(4-hydroxyphenyl)-p-diisopropylbenzene, from bis(hydroxyphenyl-alkanes, -sulfones, -sulfoxides, -ethers and -sulfides, optionally mixed with glycols, with derivatives of carbonic acid, for example, its diesters or dihalides, optionally with conjoint use of minor amounts of carboxylic acids or their derivatives which are suitable for the formation of an ester, and which possess an average molecular weight of about 10,000 to 100,000, preferably between 20,000 and 50,000.

A presently preferred polycarbonate of a dihydric phenol is represented by the formula

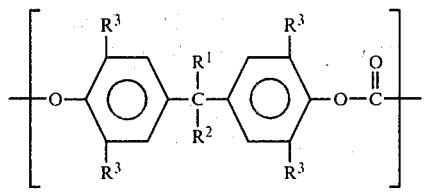

where $R^1$ and $R^2$ are hydrogen, $C_{1-4}$ alkyl or phenyl and the $R^3$ groups are selected from hydrogen or $C_{1-4}$ alkyl. It is preferred that the number of repeating units be sufficiently high to give a number average molecular weight of about 10,000 and especially a number average molecular weight of from 15,000 to 50,000. Such polymers process easily between about 425° F. and 480° F. and provide presently preferred mechanical properties.

Especially preferred aromatic polycarbonates are those of the above formula where $R^1$ and $R^2$ are methyl and the $R^3$ groups are each hyrogen. This polymer is available commercially from a number of manufacturers.

Generally useful aromatic polycarbonates have an intrinsic viscosity of at least 0.3 and preferably about 0.6 deciliters per gram (dl./g.) as measured in methylene chloride, or similar solvent systems at 25°–30° C. The upper intrinsic viscosity limit is not critical, however, will generally be about 1.5 dl./g. Especially useful polycarbonate resins generally have an intrinsic viscosity within the range of from about 0.35 to about 0.7 dl./g.

Among the many methods for making the aromatic polycarbonates, which are hereby incorporated herein in their entirety by reference, are those disclosed in Encyclopedia of Polymer Science and Technology, Vol. 10, entitled "Polycarbonates", pages 710 to 764, published by Interscience Publishers (1969).

Illustratively, generally, the aromatic polycarbonate cn be prepared by reacting a deihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformate. The acid acceptors, moleculr weight regulators and catalyst employed are well-known in the art and may be any of those commonly used to prepare polycarbonates.

The inorganic sulfur component of our flame retardant additive combination can be any alkali or alkaline earth metal salt of the general formulas $M_xSO_3$ (sulfites), e.g. $M_2SO_3$ also commonly represented by the electronic structure

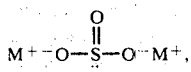

and $M_xS_2O_3$ (thiosulfate), e.g. $M_2S_2O_3$ also commonly represented by the electronic structure

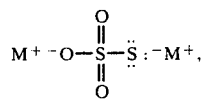

and $M_xS_2O_4$ (dithionites), e.g. $M_2S_2O_4$ also commonly represently by the electronic structure

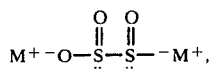

and $M_xS_2O_5$ (pyrosulfite), e.g. $M_2S_2O_5$ also commonly represented by the electronic structure

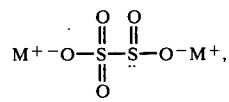

including mixtures thereof,
where M is lithium, sodium, potassium rubidium, and cesium when x is a number equal to 2, and M is beryllium, magnesium, calcium, strontium, or barium when x is a number equal to 1. The alkali or alkaline earth metal inorganic sulfite, thiosulfate, dithionite or pyrosulfite compounds are well-known and can be prepared by any of the well-known commercial processes. In all of the above compounds, an unshared pair of electrons is associated with at least one of the sulfur atoms of the compounds.

Alkali or alkaline earth metal inorganic sulfate or dithionate compounds—which do not have any unshared electron pairs associated with at least one sulfur atom—are not effective in combination with a halogenated organic compound as a flame retardant additive combination for polycarbonates, and therefore such combinations are not included within the scope of our invention.

Presently preferred inorganic sulfur components comprise compounds of the above general formulas wherein M is selected from sodium, potassium and calcium. Even more preferred are sodium and calcium sulfite salts since these salts in combination with halogenated organic compounds provide optimum flame retardant additive benefits to polycarbonate resins in general. The amount of inorganic sulfur compound that can be employed can be any effective amount, i.e. any amount which in combination with a halogenated organic compound imparts V-O flame retardance to polycarbonate flame compositions in accordance with the self-extinguishing and nondripping standards of Underwriters' Laboratories Bulletin No. 94. In general—on a weight basis—an effective amount of inorganic sulfur component is an amount of from about 0.5 to 10 or even higher, preferably 0.75 to 2, and more preferably from 1 to 1.5 parts per 100 parts of polycarbonate resin.

The halogenated organic component of our flame retardant additive combination can be any halogenated organic compound which can withstand incorporation into an aromatic polycarbonate composition at temperatures around 300° C. or higher without degrading and adversely causing color forming impurities which deleteriously affect the commercial desirability of the flame retardant aromatic polycarbonate compositions. In general, the halogenated organic compound can be any halogenated organic compound, such as, e.g. halogenated mono- or polynuclear mono- or polymeric organic compounds subject to the proviso that the compounds are substantially free of acidic or basic substituents which can deleteriously affect physical and/or chemical characteristics of aromatic polycarbonates.

Among the halogenated organic compounds that can be employed are all known isomeric or homologous monomeric forms of the following mono- or polynuclear compounds: tetrabromobenzene, hexabromobenzene, tribromophenol, octabromonaphthalene, dibromobiphenyl, hexabromobiphenyl, octabromobiphenyl, decabromobiphenyl, decabromodiphenyl ether, dibromobiphenyl carbonate, tetrabromobiphenyl carbonate, decabromobiphenyl carbonate, 1,2-(pentabromophenoxy)ethane, tetrabromo-n-methylphthalimide, tetrabromo-N-phenylphthalimide, tetrabromophthalic anhydride, tetrabromobiphenol, 4,4'-dihydroxy-2,2',6,6'-tetrabromo-3,3',5,5'-tetramethylbiphenyl, 2,2'-bis(3,5-dibromo-4-hydroxyphenyl)propane, 4,4'-bis(2-hydroxyethoxy)-2,2',6,6'-tetrabromo-3,3',5,5'-tetraphenylbiphenyl, 4,4'-diacetoxy-2,2',6,6'-tetrabromo-3,3',5,5'-tetramethylbiphenyl, 4,4'-dihydroxy-2,2',6,6'-tetrabromo-3,3',5,5'-tetramethylbiphenyldiglycidyl ether, 4,4'-diallyloxy-2,2',6,6'-tetrabromo-3,3',5,5'-tetramethylbiphenyl, 4,4'-dicyanato-2,2',6,6'-tetrabromo-3,3',5,5'-tetramethylbiphenyl, 4,4'-bis(acryloyloxy)-2,2',6,6'-tetrabromo-3,3',5,5'-tetramethylbiphenyl, etc., and mixtures thereof.

Further, illustrative of halogenated organic compounds that can be employed are all known isomeric or homologous forms of the following compounds described by the general formula

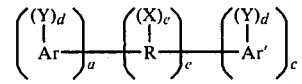

where R is an alkylene, alkylidene or a cycloaliphatic linkage, e.g. methylene, ethylene, propylene, isopropylene, isopropylidene, butylene, isobutylene, amylene, cyclohexylene, cyclopentylidene, and the like; a linkage selected from the group consisting of ether, carbonyl, amine; a sulfur-containing linkage, e.g. sulfide, sulfoxide, sulfone, carbonate; a phosphorus-containing linkage, etc., and the like. R can also consist of two or more alkylene or alkylidene linkages connected by such groups as aromatic, amino, ether, ester, carbonyl, sulfide, sulfoxide, sulfone, a phosphorus-containing linkage, etc., and the like. R can be a dihydric phenol residue, e.g. a bis ether radical derived from bisphenol-A, i.e.

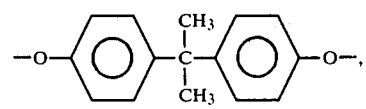

etc., and the like. Other groups which are represented by R will occur to those skilled in the art.

Ar and Ar' can be mono- or polycarbocyclic aromatic groups such as phenylene, biphenylene, terphenylene, naphthylene, etc., and the like. Ar and Ar' can be the same or different.

Y is a substituent selected from the group consisting of organic, inorganic or organometallic radicals. At least one of the substituent(s) represented by Y is a halogen, e.g. chlorine, bromine, iodine, or fluorine, and any other substituents can be (1) ether groups of the general formula —OR', wherein R' is a monovalent hydrocarbon radical similar to X, (2) monovalent hydrocarbon groups of the type represented by R, or (3) other substituents, e.g. nitro, cyano, hydroxy, etc., said substituents being essentially inert provided there be at least one and preferably two halogen atoms per aryl, e.g. phenyl nucleus.

X can be a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, etc. and the like; aralkyl groups, such as benzyl, ethylphenyl, etc. and the like; cycloaliphatic groups, such as cyclopentyl, cyclohexyl, etc. and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups can be joined by a direct carbon-carbon bond.

The hydroxy and Y substituents on the aromatic groups, Ar and Ar', can be varied in the ortho, meta or para positions on the aromatic rings and the groups can be in any possible geometric relationship with respect to one another.

Among the halogenated polymeric organic compounds that can be employed are all known isomeric or homologous forms of the following polymeric compounds: halogenated polyesters, halogenated polycarbonates, halogenated epoxy resins, halogenated polyethers, halogenated polyimides, halogenated polyamides, halogenated polystyrenes, halogenated polystyrenes, halogenated polyetherimides, halogenated polyethers, etc., and the like.

Preferred halogenated organic compounds include halogenated aromatic polycarbonates such as those derived solely from any halogenated aromatic bis-hydroxy compounds, for example 2,2'-bis(3,5-dibromo-4-hydroxyphenyl)propane, also commonly referred to as tetrabromobisphenol-A, from halogenated tetraalkyl-biphenols, such as, e.g. 4,4'-dihydroxy-2,2',6,6'-tetrabromo-3,3'5,5'-tetramethylbiphenyl, halogenated bis(-hydroxyphenyl)cycloalkanes, -sulfones, -sulfoxides, -ethers and sulfides optionally mixed with non-halogenated aromatic bis-hydroxy compounds, described elsewhere hereinbefore, as well as optionally with glycols, with derivatives of carbonic acid, for example, its diesters or dihalides, optionally with conjoint use of minor amounts of carboxylic acids or their derivatives which are suitable for the formation of an ester, and which possess an average molecular weight of at least about 500, preferably from about 10,000 to 100,000, and still more preferably from about 20,000 to 50,000. Among the many methods well-known to those skilled in the art for the preparation of halogenated aromatic polycarbonate include those set out in U.S. Pat. Nos. 3,334,154 and 3,748,303, as well as copending U.S. patent application Ser. Nos. 169,517, filed Aug. 5, 1971, now U.S. Pat. No. 3,929,908, and 450,334, filed Mar. 12, 1974, now abandoned, assigned to the assignee of this invention.

Further examples of monomeric or polymeric halogenated organic aromatic compounds which can be used with the inorganic sulfur component of our flame retardant additive combination are disclosed in Encyclopedia of Polymer Science Technology, Vol. 7, entitled "Fire Retardancy", pages 1 to 64, published by Interscience Publishers 81967).

The amount of halogenated organic compounds that can be employed can be any effective amount, i.e. any amount which in combination with the inorganic sulfur component imparts V-O flame retardance to polycarbonate compositions in accordance with the self-extinguishing and nondripping standards of Underwriters' Laboratories Bulletin No. 94. In general—on a weight basis—an effective amount of the halogenated organic compound is an amount at least sufficient to provide a bromine content of from about 0.4 to 4.0, or even higher, preferably 0.6 to 2.0, and more preferably from 0.8 to 1.5 parts per 100 parts of polycarbonate resin.

Any manner of combining the inorganic sulfur component, the halogenated organic compound and the polycarbonate can be employed in accordance with methods which will be obvious to those skilled in the art. Illustratively, a suitable method includes incorporating each ingredient in a premix, passing the premix through an extruder with an extrusion temperature maintained between about 425° and 640° F. The extrudate can be cooled, chopped into pellets, reextruded, chopped into pellets and molded or extruded into any desired shape.

Another embodiment of the invention comprises glass fiber reinforced flame retardant aromatic polycarbonates of bis-hydroxy compounds,. Any amount—on a weight basis—of glass fiber can be employed, e.g. 1 to 10, 10 to 50, 50 to 100, or even higher parts of glass fiber per 100 parts of aromatic polycarbonate. Presently preferred flame retardant polycarbonates contain from 5 to 15, and more preferably from 8 to 12 parts of glass fibers per 100 parts of aromatic polycarbonate. In general, the use of less than 15 to 20 parts of glass fibers per 100 parts of aromatic polycarbonate does not decrese the fire-resistance of the polycarbonate compositions of our invention. Generally, however, the addition of 20 to 30 parts of glass fiber per 100 of polycarbonate does decrease their fire-resistance. Accordingly, generally, larger amounts—110% to 150% or even more—than the amount of flame retardant additive used with polycarbonates containing less than 20 parts of glass fiber is required in order to obtain U.L. 94 flammability properties similar to polycarbonates containing greater than 20 parts of glass fiber.

When glass fiber (GF) flame retardant (FR) polycarbonates are employed in the practice of my invention, preferably the glass fibers have average fiber lengths of from 100–600 μm, and more preferably from 200–400 μm. Possible glass fiber materials are all commercially available types of glass fibers, such as, e.g. ground short glass fibers and rovings, but especially staple glass fiber, provided that they possess a fiber finish which is compatible with polycarbonate.

Glass fiber materials, like the flame retardant additive, can be added to the aromatic polycarbonates in various ways, e.g. the fibers can be added to the reaction mixtures before, during or after the manufacture of the polycarbonates, the fibers can be added to polycarbonate solutions or polycarbonate melts, or can be mixed with polycarbonate granules and mixtures thereof, or the fibers can be homogenized by subsequent melt extrusion, etc. In the same manufacturing process, it is possible to add to the polycarbonate in addition to the FR additive and fiber glass, other additives such as, e.g. pigments, nonreinforcing fillers, mold release agents, stabilizers, antioxidants, drip retarding agents, etc.

The following examples illustrate—but do not limit—the best mode of practicing the invention to a person skilled in the art.

Unless otherwise indicated in the examples, the following General Procedures were employed in the preparation and testing of polycarbonate compositions. Any deviations from the General Procedure will be noted in the specific examples.

General Procedure

A series of aromatic polycarbonate compositions were prepared from commercially available materials comprising (A) the polycarbonate of bisphenol-A, i.e. bis(4-hydroxyphenyl)propane-2,2, Lexan ® 100, a thermoplastic polycarbonate commercial product of General Electric Company having the following properties: intrinsic viscosity [$\eta$] of 0.55 deciliters per frame (dl./g.) as measured in dioxane at 25° C. and an $M_n$ equal to about 12,300 and a $P_n$ equal to about 48.5 units; and (B) an inorganic sulfite, and (C) a halogenated aromatic compound, i.e. decabromodiphenylether commercial product of Dow Chemical Company, by dry blending and precompounding in a hot melt extruder at about 550° F. The extrudate was pelletized. For comparative purposes, compositions containing aromatic polycarbonate free of any flame retardant additives were also prepared in pellet form.

The aromatic polycarbonate compositions combined with a halogenated organic and/or an inorganic sulfur compound as well as the control compositions were separately molded into appropriate test shapes, i.e. bars, rods, etc. for flammability testing according to the standards of Underwriters' Laboratories Item 94 (UL 94).

Individual UL 94 test specimens 1/16"×½"×5" are vertically clamped and twice exposed for 10 seconds during each exposure to a blue gas flame of 20 mm. height, the top of the gas burner is positioned about 10 mm. from the lower end of the test specimen. The specimens are positioned 12" above a horizontal layer of absorbant surgical cotton. For classifying material in a fire class, five test pieces were tested.

The following criteria were employed for classification:

| | Seconds |
|---|---|
| V-II | |
| Average Flame Out Time (FOT) | ≦25 |
| Maximum After Burning Time (ABT) after any one flame application | 30 |
| The material may drip off burning. | |
| V-I | |
| Average FOT | ≦25 |
| Maximum ABT after any one flame application | 30 |
| The material may not drip off burning. | |

| | Seconds |
|---|---|
| V-O | |
| Average FOT | ≦5 |
| Maximum ABT after any one flame appllication | 10 |
| The material must not drip off burning. | |

Additionally, the polycarbonate compositions were evaluated accordingly: (1) ASTM D256 notched Izod impact strength measured in ft.-lbs./in, employing test bars 2½" long, ½" wide and ⅛" thick, notched to a depth of 100 mils, having a notched tip radius of 10 mils, (2) ASTM D3029 drop ball test measured in ft.-lbs., (3) ASTM D638 ultimate tensile strength measured in pounds per square inch and elongation percent, and (4) ASTM D1822 S-tensile impact measured in ft.-lbs./sq.in.

EXAMPLES 1-6

The Table I data of these examples illustrate that sodium sulfite or decabromodiphenylether additives when employed in aromatic polycarbonate compositions alone impart V–II Underwriters' Laboratories UL 94 flame retardant properties to aromatic polycarbonates. However, when sodium sulfite and decabromodiphenylether are used together, the combination imparts V-O flame retardant properties to aromatic polycarbonates. On a weight basis, the amount of sodium sulfite ($Na_2SO_3$), decabromodiphenylether (DBDPE) and glass fiber (GF) employed in the tests is described in Table I in parts by weight per 100 parts by weight of aromatic polycarbonate

TABLE I

| Example No. | $Na_2SO_3$ | DBDPE | GF | U.L. 94 Rating |
|---|---|---|---|---|
| 1. | 1.0 | none | 9.0 | V-II |
| 2. | 1.5 | none | 9.0 | V-II |
| 3. | none | 0.5 | 9.0 | V-II |
| 4. | 1.0 | 0.5 | 9.0 | V-O |
| 5. | 1.5 | 0.5 | 9.0 | V-O |
| 6. | 1.0 | 1.0 | 9.0 | V-O |

The substitution of other alkali or alkaline earth metal salts of an inorganic sulfite, thiosulfate, dithionite or pyrosulfite, or mixtures thereof for the sodium sulfite employed in the above examples, and the substitution of other halogenated organic compounds for the decabromodiphenylether employed in the above examples provides analogous improved results in the flame-retardant character of polycarbonates.

EXAMPLES 7-12

The Table I data of these examples illustrate that our flame retardant combinations, e.g. sodium sulfite and decabromodiphenylether do not deleteriously affect the physical properties of an aromatic polycarbonate. For control purposes a sufficient amount of a brominated Lexan ® 100 type aromatic polycarbonate was combined with a Lexan ® 100 polycarbonate to provide a bromine content of 1% by weight of the polycarbonate combination. On a weight basis, the amount of sodium sulfite, decabromodiphenylether and glass fiber employed in the tests is described in Table I in parts by weight per 100 parts by weight of aromatic polycarbonate.

TABLE I

| Example No. | Na₂SO₃ | DBDPE | GF | U.L. 94 Rating | Notched Izod | D.B.[1] | T.S.[2] | E.[3] | S-T.I.[4] |
|---|---|---|---|---|---|---|---|---|---|
| 7.[a] | none | none | 9.0 | V-II | 2.0 | 125 | 8320 | 9 | 32.6 |
| 8. | 1.0 | 0.5 | 9.0 | V-O | 1.6 | 87.5–100 | 8480 | 14.0 | 46.8 |
| 9. | 1.0 | 0.5 | 9.0 | V-O | 1.8 | 87.5–100 | 9270 | 11.0 | 50.5 |
| 10. | 1.25 | 0.5 | 9.0 | V-O | 1.8 | 87.5–100 | 8450 | 14.5 | 39.2 |
| 11. | 1.25 | 0.5 | 9.0 | V-O | 2.5 | 87.5–100 | 9160 | 10.0 | 40.9 |
| 12. | 1.5 | 0.5 | 9.0 | V-O | 1.6 | 87.5–100 | 9220 | 9.5 | 39.7 |

[a] control polycarbonate containing 1% by weight bromine
[1] drop ball
[2] tensile strength
[3] elongation
[4] S-tensile impact The substitution of other inorganic salts and other halogenated organic compounds—described elsewhere hereinbefore, for sodium sulfite and decabromodiphenylether, respectively—provides analogous flame retardant aromatic polycarbonate compositions having comparable physical and chemical properties.

EXAMPLE 13

The Table I data of this example illustrates that our flame retardant combinations, e.g. sodium sulfite and decabromodiphenyl ether impart U.L. 94 flammability characteristics to polycarbonates. On a weight basis, the amount of sodium sulfite and decabromodiphenylether employed in the tests is described in Table I in parts by weight per 100 parts by weight of aromatic polycarbonate.

TABLE I

| Example No. | Na₂SO₃ | DBDPE | GF | FOT | Σ Drip | U.L. 94 Rating |
|---|---|---|---|---|---|---|
| 13 | 1.0 | 0.5 | none | 2.71 | 7 | V-II |

The substitution of other alkali or alkaline earth metal salts of an inorganic sulfite, thiosulfate, dithionite or pyrosulfite, or mixtures thereof for the sodium sulfite employed in the above examples, and the substitution of other halogenated organic compounds for the decabromophenylether employed in the above example provides analogous improved results in the flame-retardant character of polycarbonates.

Accordingly, from the foregoing examples, it is seen that aromatic polycarbonate compositions which contain a metal salt of inorganic sulfur compound—wherein at least one sulfur atom of the compound has an unshared electron pair—and a halogenated organic compound are flame retardant compounds.

Other modifications and variations of the present invention are possible inlight of the above teachings.

We claim:

1. A polycarbonate comprising an aromatic polycarbonate and a flame retardant additive combination consisting of a halogenated organic compound and an alkali or alkaline earth metal salt of an inorganic sulfite, thiosulfate, dithionite, or a pyrosulfite, and mixtures thereof.

2. The composition of claim 1, where on a weight basis the bromine content of the halogenated organic compound:metal salt:polycarbonate proportions are within the range of from about 0.4:0.5:100 to about 4.0:10:100.

3. The composition of claim 1, further comprising a glass fiber.

4. The composition of claim 3, where on a weight basis the glass fiber:polycarbonate proportions are within the range of from about 5:100 to about 15:100.

5. The composition of claim 1, where the metal is sodium.

6. The composition of claim 1, where the metal is calcium.

7. The composition of claim 1, where the aromatic polycarbonate is of the formula

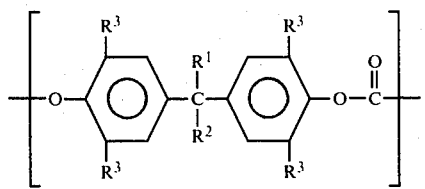

where independently each $R^1$ and $R^2$ is selected from hydrogen, $C_{1-4}$ alkyl and phenyl, independently each $R^3$ group is selected from hydrogen and $C_{1-4}$ alkyl, and has an intrinsic viscosity of within the range of from about 0.35 to about 0.7 dl./g. as measured in methylene chloride at 25°–30° C.

8. The composition of claim 7, where the metal salt is Na₂SO₃.

9. The composition of claim 7, where the halogenated organic compound is decabromodiphenylether.

10. A polycarbonate comprising an aromatic polycarbonate and a flame retardant additive combination consisting of decabromodiphenylether and an alkali or alkaline earth metal salt of an inorganic sulfite, thiosulfate, dithionite, or a pyrosulfite, and mixtures thereof.

* * * * *